ceeded Oct. 25, 1955

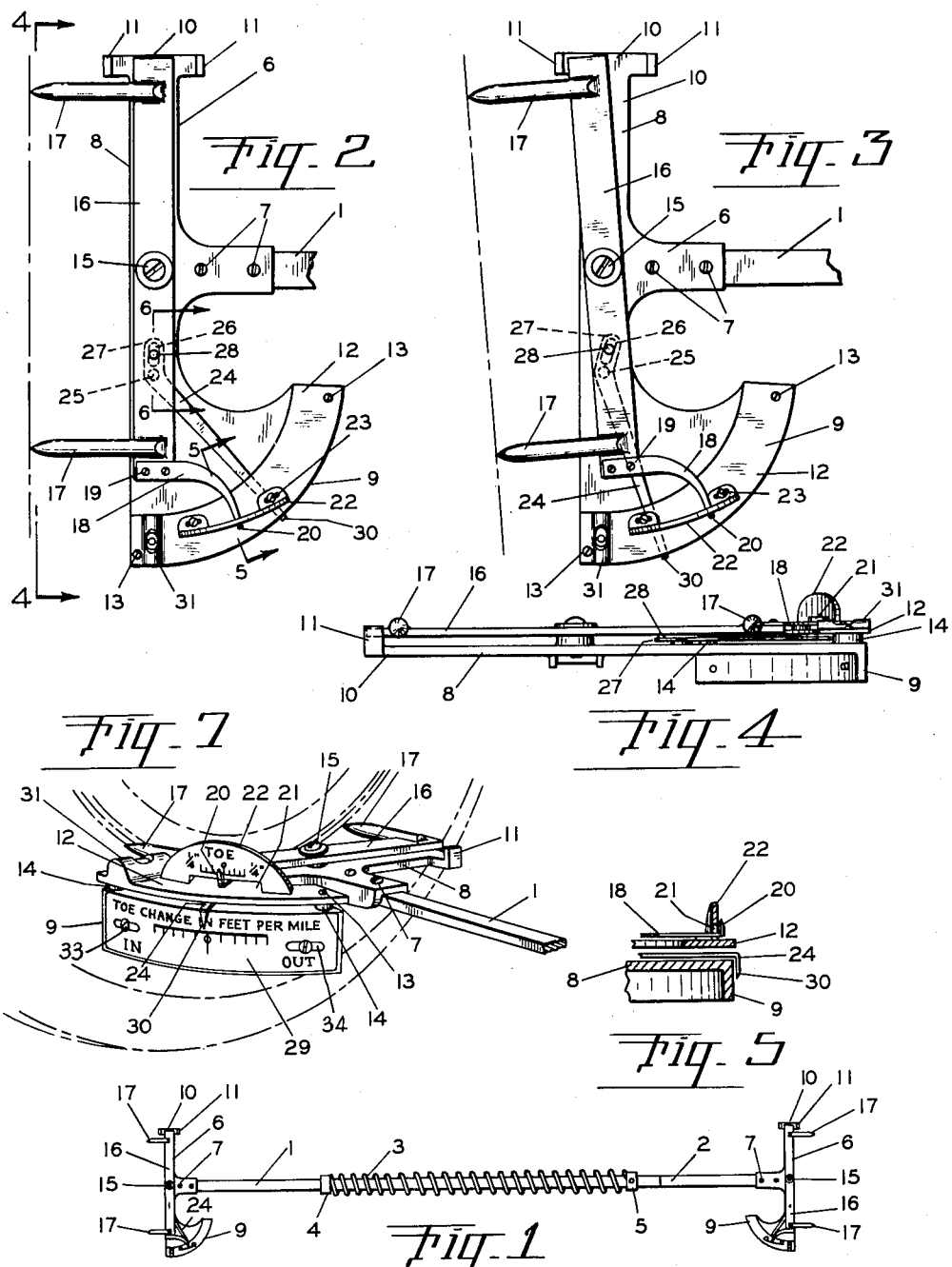

United States Patent Office

2,721,394
Patented Oct. 25, 1955

2,721,394

WHEEL ALIGNMENT GAUGE

Frederick A. Yerkes, Portland, Oreg.

Application July 27, 1953, Serial No. 370,317

4 Claims. (Cl. 33—203.2)

My invention relates to wheel alignment gauges, and is particularly adapted for aligning knee action wheels.

The primary object of the invention is to construct a wheel alignment gauge that will indicate to the operator change of toe-in due to variation of load, sudden stops or roll on curves.

A further object of my invention is to construct a wheel aligning gauge that will prove the accuracy of adjustment for toe-change after the adjustments have been completed.

A further object of my invention is to incorporate an indicator for indicating the setting for normal toe-in.

A further object of my invention is to provide the feature of aligning the wheels straight ahead while checking tracking and centering of the steering wheel.

These and other incidental objects will be apparent in the drawings, specification and claims.

Referring to the drawings:

Figure 1 is a plan view of my new and improved wheel aligning gauge.

Figure 2 is an enlarged plan view of one end of the unit.

Figure 3 is the same as Figure 2, except that toe-in is being indicated.

Figure 4 is an end view, taken on line 4—4 of Figure 2, looking in the direction indicated.

Figure 5 is a fragmentary sectional detail, taken on line 5—5 of Figure 2.

Figure 6 is an enlarged fragmentary sectional detail, taken on line 6—6 of Figure 2.

Figure 7 is a perspective view, looking towards the inside of a wheel, said wheel shown by broken lines.

Referring more specifically to the drawings:

My new and improved wheel alignment gauge consists of spacing bars 1 and 2 slidably connected together, having the spring 3 engaging the keepers 4 and 5. This spring expands or tends to force the bars 1 and 2 in extended position, and is of well known construction in other gauges.

My invention consists of mounting my new and improved gauge assemblies or heads 6 to the ends of the bars 1 and 2, as for instance by the bolts 7. My new and improved gauge assembly or head consists of a base member 8, which has an enlarged dial holding base 9 on one of its ends. Its opposite end 10 having upwardly extending fingers 11. The object of which will be described later.

The dial holding base 9 has a dial holding plate 12, removably mounted thereabove and held thereto by way of screws 13 and spacer pads 14 forming part of the base 9. Pivotally mounted to the base 8 by the pivot bolt 15 is a support member 16. Wheel engaging points 17 are fixedly secured to the said support and are adapted to engage the side of the tire adjacent the rim as best illustrated in Figure 7.

A pointer 18 is fixedly secured to one end of the support 16 by any suitable means, as for instance screws 19. The point 20 of this pointer operates through a slot 21 formed within the dial 22. The dial 22 is secured to the upper surface of the plate 12 by any suitable means, as for instance the screws 23, which permit adjustment of the same. This pointer gives a direct indication from the tire of the normal toe-in of the wheels.

For taking the toe-change in feet per mile when the load on the wheels is varied, a more sensitive pointer is brought into action. The reason for this more sensitive pointer is to magnify the change in toe-in to the operator so that he can more accurately adjust this toe-in due to the change of load applied to the wheels.

I accomplish this result by pivotally mounting the pointer 24 to the base member 8 by way of the pin 25, which is anchored to the base member. A slot 26 is formed within the end 27 of the pointer and is adapted to receive the pin 28, which is anchored to the support 16, all of which is best illustrated in Figures 2, 3 and 5.

By referring to Figures 2 and 3, it will be noted that a small movement of the support 16 about its pivot bolt 15 will move the point 30 of the pointer 24 a considerable distance over the dial 29. This particular feature carries out the primary object of my invention. The movement of the support 16 about its pivot is limited by the fingers 11. I provide a leveling indicator 31 for leveling the gauge in regards to its installation between the wheels.

The dial holding base 9 adjustably supports dial 29 by means of screws 33 passing through slots 34 provided in dial 29.

I will now describe the operation of my new and improved wheel aligning gauge. The points 17 are brought to bear against the inner surfaces of the tire adjacent the rim. The spring 3 expanding the gauge heads 6 between the said wheels. The normal toe-in reading is taken from the point 20 of the pointer 18 moving across the face of the dial 22. This gauge always checks in inches or fraction of an inch of toe.

The toe-change due to load variations is read directly from the dial 29. This dial indicates toe-change in feet per mile and considerable movement of the point 30 of the pointer 24 takes place in this reading, as the condition of change of toe is present when the load is varied. In order to accomplish the load change, the operator raises the front end of the vehicle up and down by a special tool, not here shown.

The scale or dial 29 is adjustable on base 9 so as to bring the pointer 30 to a zero reading before flexing the vehicle; then when the vehicle is moved up and down, the amount of toe-change is indicated on dial 29. The dial 22 is a permanent scale, which is definitely required in order to set the toe-in of the wheels, while the dial 29 is adjustable to correct the toe-change. By being able to read both dials at the same time considerable time is saved, reducing what ordinarily is three operations to one operation in the checking of the toe-in and toe-change.

The dials are located on the front of the bases of the heads 6 so that they can be readily observed by the operator.

What is claimed is:

1. A wheel aligning gauge comprising a base member, first and second dials superimposed at the front end of said base member and facing in the same general direction, means for adjustably positioning said second dial relative to the first dial, a support pivotally mounted on said base member, a pair of wheel engaging elements spaced on said support on opposite sides of the pivotal mounting thereof, a pointer on said support and extending to register with the first of said dials to indicate the normal toe-in reading in fractions of an inch, a second pointer pivotally mounted on said base member and extending to registration with the second of said dials to indicate the toe-change due to load variation in feet per mile, said second dial being adjustable to bring its pointer to a zero reading before flexing the vehicle for a toe-change indication by said second dial, and a connection between said support and said second pointer for moving said second pointer through an amplified stroke relative to the angular movement of said support.

2. A gauge as defined in claim 1 wherein said connection comprises a pin and slot connection between said support and second pointer and disposed adjacent the pivotal mounting of said second pointer and spaced from the pivotal mounting of said support.

3. A gauge as defined in claim 1 comprising a pair of stops on said base member and limiting the pivotal movement of said support.

4. A gauge as defined in claim 1 comprising a level mounted on said base member substantially longitudinally of said support.

References Cited in the file of this patent

UNITED STATES PATENTS

| | | |
|---|---|---|
| 1,163,594 | Fry | Dec. 7, 1915 |
| 1,492,156 | Caldwell | Apr. 29, 1924 |
| 1,665,544 | Hartsook | Apr. 10, 1928 |
| 1,777,686 | Bagge | Oct. 7, 1930 |
| 2,509,466 | Leach | May 30, 1950 |
| 2,522,916 | Zeigler | Sept. 19, 1950 |
| 2,649,788 | Tyerman | Aug. 25, 1953 |
| 2,664,644 | Tyerman | Jan. 5, 1954 |